United States Patent
Kuwata

(10) Patent No.: US 11,444,801 B2
(45) Date of Patent: Sep. 13, 2022

(54) GATEWAY DEVICE

(71) Applicant: Hitachi Automotive Systems, Ltd., Hitachinaka (JP)

(72) Inventor: Mitsunori Kuwata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 77 days.

(21) Appl. No.: 17/049,092

(22) PCT Filed: Feb. 15, 2019

(86) PCT No.: PCT/JP2019/005498
§ 371 (c)(1),
(2) Date: Oct. 20, 2020

(87) PCT Pub. No.: WO2019/207917
PCT Pub. Date: Oct. 31, 2019

(65) Prior Publication Data
US 2021/0243049 A1   Aug. 5, 2021

(30) Foreign Application Priority Data

Apr. 23, 2018   (JP) .............................. JP2018-082474

(51) Int. Cl.
*H04L 12/40* (2006.01)
*H04L 12/66* (2006.01)

(52) U.S. Cl.
CPC .. *H04L 12/40078* (2013.01); *H04L 12/40013* (2013.01); *H04L 12/40039* (2013.01);
(Continued)

(58) Field of Classification Search
CPC ......... H04L 12/40078; H04L 12/40013; H04L 12/40039; H04L 12/40097;
(Continued)

(56) References Cited

U.S. PATENT DOCUMENTS 8,015,445 B2 *  9/2011  Ando .................. H04L 43/0823
                                                          714/25
8,934,351 B2 *  1/2015  Matsui ................ H04L 43/0847
                                                          701/29.7
(Continued)

FOREIGN PATENT DOCUMENTS

EP       2079190 A1 *  7/2009  ......... H04L 43/0823
JP       H04-304737 A    10/1992
(Continued)

OTHER PUBLICATIONS

International Search Report with English translation and Written Opinion issued in corresponding application No. PCT/JP2019/005498 dated May 28, 2019.

*Primary Examiner* — Jay P Patel
(74) *Attorney, Agent, or Firm* — Foley & Lardner LLP

(57) ABSTRACT

To provide a gateway device capable of continuing communication in the event of an abnormality without a redundant configuration as a system. A gateway device 100 includes a plurality of transceivers 110, 112, and 114 connected to a plurality of communication buses 1, 2, and 3 in a one-to-one manner, and a switch element 50 that connects the two communication buses 1 and 2 having different priorities among the plurality of communication buses.

11 Claims, 4 Drawing Sheets

(52) U.S. Cl.
CPC .. *H04L 12/40097* (2013.01); *H04L 12/40143*
(2013.01); *H04L 12/66* (2013.01); *H04L*
*2012/40273* (2013.01)

(58) Field of Classification Search
CPC ............... H04L 12/40143; H04L 12/66; H04L
2012/40273; H04L 12/12; H04L
2012/40215; H04L 12/40189; H04L
45/28; H04L 45/22; H04L 12/46; H04W
4/24
See application file for complete search history.

(56) References Cited

U.S. PATENT DOCUMENTS

| | | | | |
|---|---|---|---|---|
| 9,083,477 | B2* | 7/2015 | Matsui | H04J 3/0658 |
| 10,135,866 | B2* | 11/2018 | Choi | G06F 3/067 |
| 10,992,705 | B2* | 4/2021 | Shin | H04L 12/40176 |
| 11,044,260 | B2* | 6/2021 | Shin | G06F 21/552 |
| 11,250,708 | B2* | 2/2022 | Shimizu | G06V 20/582 |
| 2009/0183033 | A1* | 7/2009 | Ando | H04L 43/0823 714/43 |
| 2012/0243426 | A1* | 9/2012 | Matsui | H04L 1/1887 370/252 |
| 2012/0243585 | A1* | 9/2012 | Matsui | H04J 3/0658 375/219 |
| 2013/0185389 | A1* | 7/2013 | Nakamura | H04L 67/10 709/217 |
| 2016/0359545 | A1* | 12/2016 | Kodama | H04L 12/407 |
| 2017/0155679 | A1* | 6/2017 | Choi | G06F 3/0623 |
| 2017/0286675 | A1* | 10/2017 | Shin | H04W 12/61 |
| 2018/0091550 | A1* | 3/2018 | Cho | B60R 16/0232 |
| 2018/0191488 | A1* | 7/2018 | Matsudaira | H04L 25/03 |
| 2020/0036508 | A1* | 1/2020 | Matsudaira | H04L 12/40 |
| 2020/0043344 | A1* | 2/2020 | Shimizu | G08G 1/00 |
| 2020/0213351 | A1* | 7/2020 | Shin | H04L 63/1408 |

FOREIGN PATENT DOCUMENTS

| | | |
|---|---|---|
| JP | 2006-333007 A | 12/2006 |
| JP | 2010-206651 A | 9/2010 |
| JP | 2014-72673 A | 4/2014 |
| JP | 2015-005825 A | 1/2015 |

* cited by examiner

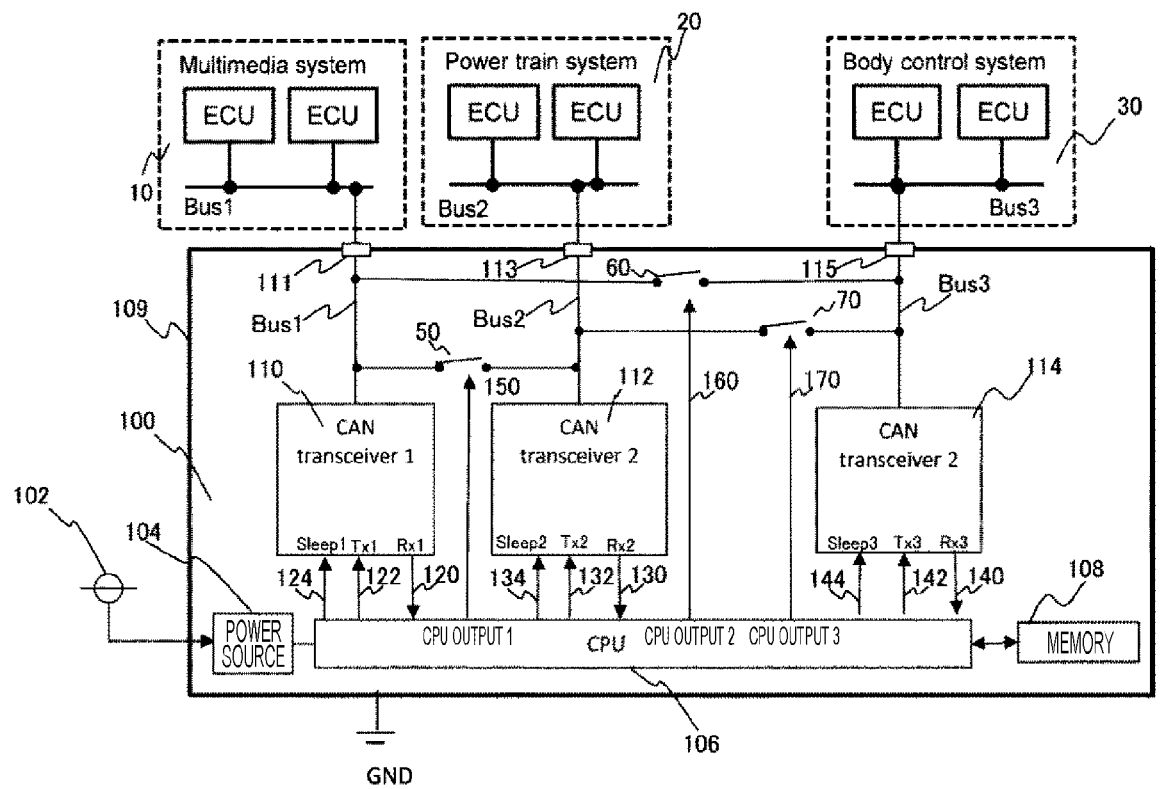

FIG. 5
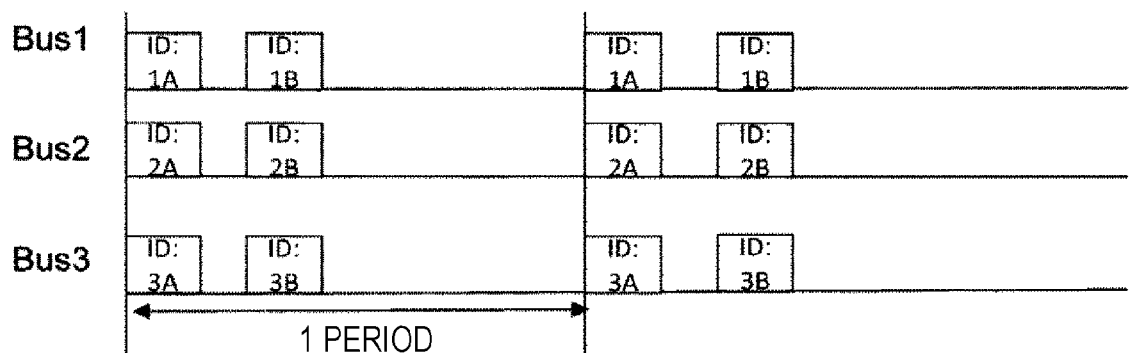
(a) NORMAL STATE
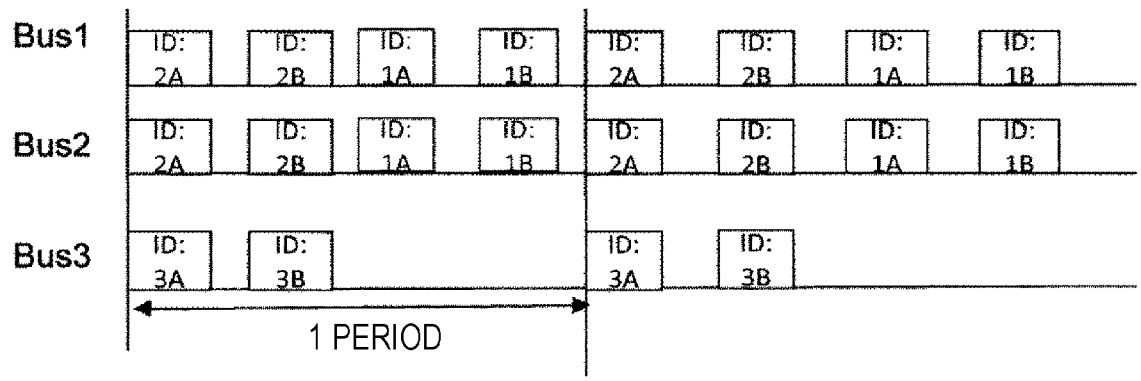
(b) FAILURE OF Bus2

GATEWAY DEVICE

TECHNICAL FIELD

The present invention relates to an in-vehicle control device, for example, an in-vehicle gateway device that is connected between a plurality of networks and transmits and receives information.

BACKGROUND ART

Vehicles such as automobiles in recent years are equipped with a large number of in-vehicle ECUs such as an in-vehicle electronic control device (sometimes referred to as in-vehicle ECU) that control various in-vehicle control system devices such as engines and brakes, and an in-vehicle electronic control device that controls meters for displaying various states of the vehicle. In the vehicle, the in-vehicle ECUs are connected by communication lines to form a network, and various data are transmitted and received between the in-vehicle ECUs via the network.

A gateway device is a device that is connected to such a network and is responsible for transmitting and receiving information between the in-vehicle ECUs. When a gateway device fails, data transmission/reception via the network is stopped, so the gateway device is required to have high reliability.

In addition, there are particularly important buses for in-vehicle communication buses such as CAN bus.

For example, a power train communication bus to which an in-vehicle ECU for engine control is connected is very important, and if a failure occurs and communication is disabled, engine restart is disabled.

JP 2006-333007 A (PTL 1) is a document relating to a technique that attempts to solve this type of problem. This publication discloses an in-vehicle communication system in which a plurality of dual-system in-vehicle communication devices connected to a first communication bus and a second communication bus, and at least one single-system in-vehicle communication device connected only to the second communication bus are mixed. In the in-vehicle communication system, at least one of the plurality of dual-system in-vehicle communication devices acquires data transmitted by another dual-system in-vehicle communication device via the first communication bus, and transmits the data to the second communication bus. By constructing the vehicle communication system in this way, even if one of the plurality of dual-system in-vehicle communication devices has a transmission failure condition on the second communication bus side, the data transmitted from the dual-system in-vehicle communication device is acquired by the other dual-system in-vehicle communication device via the first communication bus and transmitted to the second communication bus. Therefore, the data transmitted from the dual-system in-vehicle communication device which has been failed in communication on the second communication bus side can be surely received by the single-system in-vehicle communication device.

CITATION LIST

Patent Literature

PTL 1: JP 2006-333007 A

SUMMARY OF INVENTION

Technical Problem

When the in-vehicle communication system as described in PTL 1 is applied to a gateway device for a vehicle, there is always required a plurality of dual-system in-vehicle communication devices connected to both the first communication bus and the second communication bus. That is, it is necessary to make the system redundant, and the gateway device tends to be expensive.

An object of the invention is to provide a gateway device capable of continuing communication in the event of an abnormality without a redundant configuration as a system.

Solution to Problem

The present application includes a plurality of means for solving the above problems. As an example, it is assumed that a gateway device includes a plurality of transceivers that are connected to a plurality of communication buses in a one-to-one manner, and at least one switch element that connects two communication buses having different priorities among the plurality of communication buses.

Advantageous Effects of Invention

According to the invention, since communication between ECUs can be continued even when an abnormality occurs without a redundant configuration as a system, an inexpensive and highly reliable gateway device can be provided.

BRIEF DESCRIPTION OF DRAWINGS

FIG. 1 is a schematic configuration diagram of one in-vehicle electronic control device according to an embodiment of the invention.

FIG. 2 is a diagram illustrating a configuration example of a priority table of communication buses 1, 2, and 3 stored in a memory.

FIG. 5 is a diagram illustrating an example of data flowing on a network configured by each communication bus.

DESCRIPTION OF EMBODIMENTS

Figure 3:
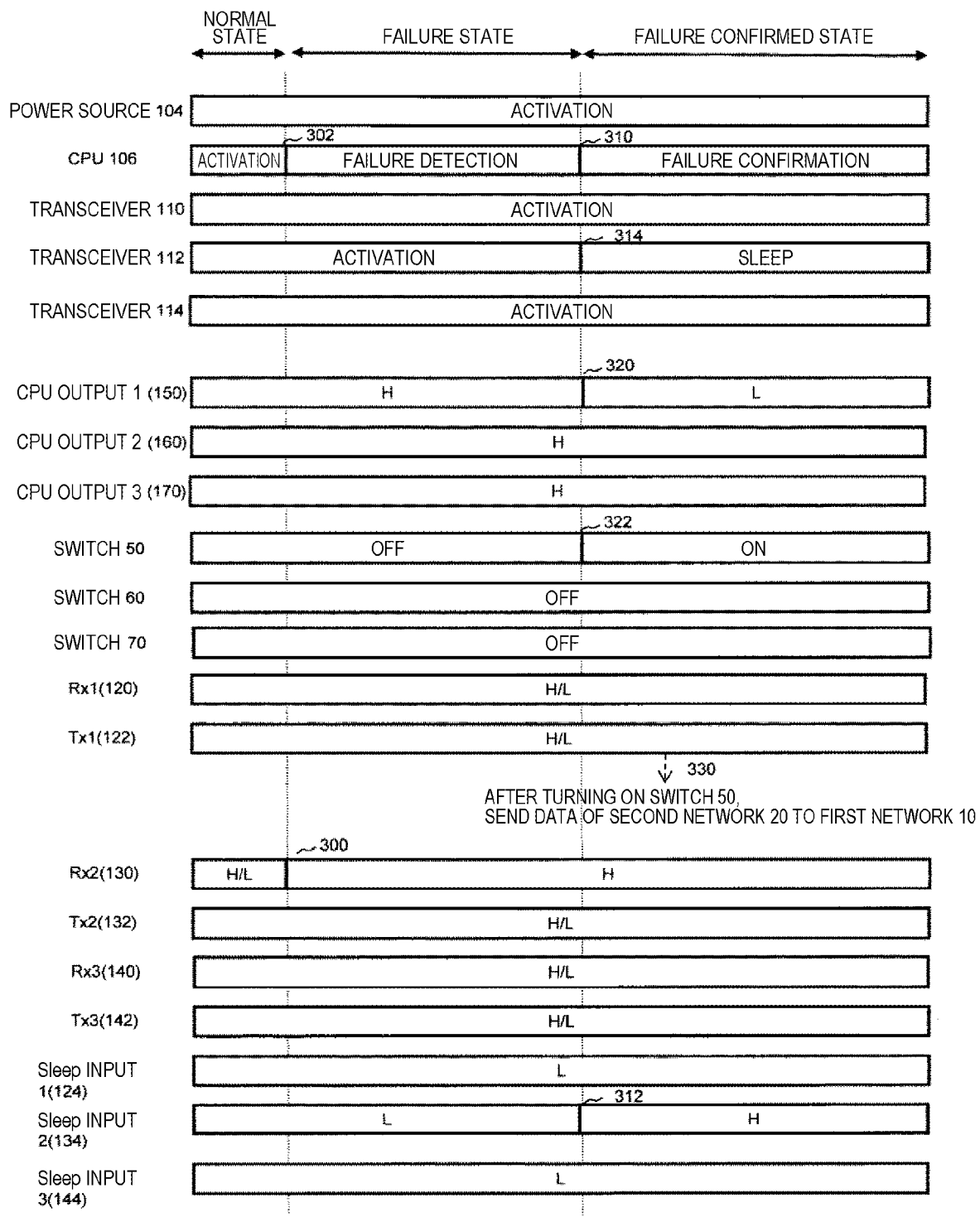
FIG. 3 is an example of a time chart for explaining the operation of each unit in the in-vehicle electronic control device of FIG. 1.

Hereinafter, embodiments of the invention will be described using the drawings.

First Embodiment

FIG. 1 schematically illustrates a control circuit configuration of an in-vehicle electronic control device (in-vehicle ECU (Electronic Control Unit)). An in-vehicle ECU 100 functions as a gateway device (also referred to as a gateway ECU), and is connected with a plurality of in-vehicle networks 10, 20, and 30 (hereinafter, this may be referred to as networks).

Although CAN (Controller Area Network) is used as the communication protocol for the networks 10, 20, and 30 of this embodiment, other protocols may be used.

A plurality of ECUs (ECU group) are connected to the network 10 via a communication bus (CAN Bus) 1. These ECUs are configured by multimedia ECUs, and may include, for example, a car navigation ECU and an audio control ECU.

A plurality of ECUs (ECU group) are connected to the network 20 via a communication bus (CAN Bus) 2. These ECUs are configured by power train ECUs, and may include, for example, an engine control ECU, a brake control ECU, a transmission control ECU, and the like.

A plurality of ECUs (ECU group) are connected to the network 30 via a communication bus (CAN Bus) 3. These ECUs are configured by body-type ECUs, and may include a power window ECU, a seat belt ECU, and the like.

The communication buses (CAN Buses) 1, 2, and 3 each are a two-wire bus and made of two communication lines (twisted pair cable), but it is simplified and illustrated as one communication line in FIG. 1.

Inside a housing 109 of the ECU 100, there are stored a power source circuit 104, a CPU 106 that is a processing device that controls signal processing in the ECU 100, a non-volatile memory 108 such as a flash memory, three transceivers (CAN transceivers) 110, 112, and 114 which are a communication device for transmitting and receiving electrical signals, and three switch elements 50, 60, and 70.

Further, the housing 109 is provided with terminals 111, 113, and 115 to which the communication buses 1, 2, and 3 connected to external in-vehicle ECUs of the networks 10, 20, and 30 are connected. The terminal 111 is connected to the communication bus 1 connected to the transceiver 110 in the housing 109, the terminal 113 is connected to the communication bus 2 connected to the transceiver 112 in the housing 109, and the terminal 115 is connected to the communication bus 3 connected to the transceiver 114 in the housing 109.

A voltage (VB) 102 supplied from a battery (not illustrated) and an alternator (not illustrated) driven by an engine (not illustrated) is supplied to a power source circuit 104 inside the ECU 100.

The power source circuit 104 generates a positive power source voltage (VCC) to be supplied to a signal system element such as the CPU 106. The CPU 106 controls the operation of the ECU 100. The memory 108 communicates with the CPU 106 and stores various data. In particular, the memory 108 of this embodiment stores information on a priority (priority of the communication bus) for each network, and this information is used for determination at the time of failure.

The number of transceivers 110, 112, and 114 is the same as the number of communication buses 1, 2, and 3 (networks 10, 20, and 30), and the three transceivers 110, 112, and 114 are connected to the three communication buses 1, 2, and 3 in a one-to-one manner. The CPU 106 is communicatively connected to each of the three transceivers 110, 112, and 114.

The transceiver 110 is a component for performing CAN communication with the ECU group belonging to the first network 10 via the communication bus 1, and transmits the data received via the network 10 from an Rx1 output terminal 120 to the CPU 106, and transmits transmission data received through a Tx1 output terminal 122 from the CPU 106 to the network 10. The transceiver 110 includes a sleep-1 input terminal 124 as a control pin for shifting to a sleep state in which the power consumption of the transceiver 110 is reduced. The transceiver 110 is operated to be disconnected from the network 10 by entering the sleep state. For example, the transceiver 110 can be separated from the network 10 by putting it into the sleep state when the transceiver 110 fails. Specifically, when the value of the sleep-1 input terminal 124 is an H signal (a signal whose voltage value or current value is higher than a predetermined threshold is referred to as an H signal (High signal)), the transceiver 110 enters the sleep state. When the value of the sleep-1 input terminal 124 is an L signal (a signal whose voltage value or current value is lower than a predetermined threshold value is referred to as an L signal (Low signal)), a normal state is set.

The transceiver 112 is a component for performing CAN communication with the ECU group belonging to the second network 20 via the communication bus 2, and transmits the data received via the network 20 from an Rx2 output terminal 130 to the CPU 106, and transmits transmission data received through a Tx2 output terminal 132 from the CPU to the network 20. The transceiver 112 includes a sleep-2 input terminal 134 as a control pin for shifting to a sleep state in which the power consumption of the transceiver 112 is reduced. The transceiver 112 is operated to be disconnected from the network 20 by entering the sleep state. For example, the transceiver 112 can be separated from the network 20 by putting it into the sleep state when the transceiver 112 fails. Specifically, the transceiver 112 enters the sleep state when the value of the sleep-2 input terminal 134 is the H signal, and enters the normal state when the value of the sleep-2 input terminal 134 is the L signal.

The transceiver 114 is a component for performing CAN communication with the ECU group belonging to the third network 30 via the communication bus 3, and transmits the data received via the network 30 from an Rx3 output terminal 140 to the CPU 106, and transmits transmission data received through a Tx3 output terminal 142 from the CPU to the network 30. The transceiver 114 includes a sleep-3 input terminal 144 as a control pin for shifting to a sleep state in which the power consumption of the transceiver 114 is reduced. The transceiver 114 is operated to be disconnected from the network 30 by entering the sleep state. For example, the transceiver 114 can be separated from the network 30 by putting it into the sleep state when the transceiver 114 fails. Specifically, the transceiver 114 enters the sleep state when the value of the sleep-3 input terminal 144 is the H signal, and enters the normal state when the value of the sleep-3 input terminal 144 is the L signal.

The CPU 106 performs CAN communication with the network 10 using the transceiver 110, performs CAN communication with the network 20 using the transceiver 112, and performs CAN communication with the network 30 using the transceiver 114. Further, the CPU 106 outputs a control output (sleep signal) to the sleep-1 input terminal 124 for putting the transceiver 110 into the sleep state, a control output (sleep signal) to the sleep-2 input terminal 134 for putting the transceiver 112 into the sleep state, a control output (sleep signal) to the sleep-3 input terminal 144 for putting the transceiver 114 into the sleep state, a CPU output 1 (150) for switching the open/closed state of a first switch 50, a CPU output 2 (160) for switching the open/closed state of a second switch 60, and a CPU output 3 (170) for switching the open/closed state of a third switch 70.

The switch 50 is a switch element provided in the housing 109 for controlling the connection between the network 10 (communication bus 1) and the network 20 (communication bus 2), and is provided on the path that connects the communication bus 1 (CAN Bus line) and the communication bus 2 (CAN Bus line) in the housing 109. The open/closed state of the switch 50 is switched according to the output value of a CPU output 150. Specifically, when the value of the CPU output 150 is the H signal, the switch 50 is set to the OFF state (open state), and when the value of the CPU output 150 is the L signal, the switch 50 is set to the ON state (closed state).

The switch 60 is a switch element provided in the housing 109 for controlling the connection between the network 10 (communication bus 1) and the network 30 (communication bus 3), and is provided on the path that connects the communication bus 1 (CAN Bus line) and the communication bus 3 (CAN Bus line) in the housing 109. The open/closed state of the switch 60 is switched according to the output value of a CPU output 160. Specifically, when the value of the CPU output 160 is the H signal, the switch 60 is set to the OFF state (open state), and when the value of the CPU output 160 is the L signal, the switch 60 is set to the ON state (closed state).

The switch 70 is a switch element provided in the housing 109 for controlling the connection between the network 20 (communication bus 2) and the network 30 (communication bus 3), and is provided on the path that connects the communication bus 2 (CAN Bus line) and the communication bus 3 (CAN Bus line) in the housing 109. The open/closed state of the switch 70 is switched according to the output value of a CPU output 160. Specifically, when the value of the CPU output 170 is the H signal, the switch 70 is set to the OFF state (open state), and when the value of the CPU output 170 is the L signal, the switch 70 is set to the ON state (closed state).

FIG. 2 illustrates a configuration example of a priority table 200 of the communication buses 1, 2, and 3 (networks 10, 20, and 30) stored in the memory 108. In the example of FIG. 2, the priority table is configured by identification information of each communication bus, priority information, and a network name. In this embodiment, the smaller the number, the higher the priority. For example, the communication bus 2 is a bus to which an engine ECU or the like is connected and has the highest priority. In this embodiment, when the transceiver 112 connected to the communication bus 2 fails, it is possible to continue the normal operation of the vehicle by transmitting/receiving the data of the communication bus 2 via the communication bus 1 having the lowest priority.

Since the priority table 200 is different for each vehicle, it can be adapted to various vehicles by being rewritten during the shipping test, for example.

FIG. 3 illustrates a time chart for explaining the operation of each unit in the ECU 100 illustrated in FIG. 1.

(1) Normal State

First, the normal state will be described. The power source 104 and the CPU 106 are in the activated state. From the CPU 106, H signals are output as CPU output 1 (150), CPU output 2 (160) and CPU output 3 (170), and the switch 50, the switch 60, and the switch 70 are all set to the OFF state. Further, the L signal is output to the sleep-1 input terminal 124, the sleep-2 input terminal 134, and the sleep-3 input terminal 144, and the transceiver 110, the transceiver 112, and the transceiver 114 are all in the normally activated state.

The Rx1 output terminal 120, the Rx2 output terminal 130, and the Rx3 output terminal 140 output an H signal or an L signal according to the received data from the networks 10, 20, and 30. The H signal or the L signal is input to the Tx1 output terminal 122, the Tx2 output terminal 132, and the Tx3 output terminal 142 according to the transmission data of the CPU 106.

(2) Failure State

Next, transition to a failure state when a failure occurs in the transceiver 112 connected to the network 20 will be described. When a failure occurs in the transceiver 112 and it becomes impossible to send and receive data, the signal output from the Rx2 output terminal 130 of the transceiver 112 is fixed to the default H signal (see timing 300 in FIG. 3). Thus, when the input signal from any one of the Rx output terminals 120, 130, and 140 of the transceivers 110, 112, and 114 is fixed to either one of the H signal and the L signal (in this embodiment, the signal is fixed to the H signal), the CPU 106 detects that data cannot be received from a transceiver related to the output terminal (in the example of FIG. 3, the transceiver 112 related to the Rx2 output terminal 130) (see the timing of symbol 302 in FIG. 3). However, since there is a possibility that temporary data has not been received due to disturbance noise or the like, the failure of the transceiver (112) is not yet determined at this timing.

(3) Failure Confirmed State

Next, the transition to a failure confirmed state will be described. If data (CAN signal) cannot be received from any one of the Rx output terminals 120, 130, and 140 for a predetermined time (for example, 2 seconds) or longer, the CPU 106 confirms that a transceiver associated with the Rx output terminal has failed (310). In this embodiment, the CPU 106 confirms the failure of the transceiver 112 when the unreceived data of the Rx2 terminal 130 continues for 2 seconds or more. After the failure is confirmed, the CPU 106 confirms an identification number of the communication bus connected to the transceiver whose failure is confirmed, refers to the priority of each communication bus stored in the memory 108, and determines an action after the failure according to the priority of the communication bus connected to the transceiver whose failure is confirmed.

(3-1) Action When Failure of Communication Bus with the Lowest Priority is Confirmed When the failure of the transceiver connected to the communication bus with the lowest priority is confirmed (when the failure of the transceiver 110 related to the communication bus 1 of priority 3 is confirmed in the example of FIG. 2), the CPU 106 notifies an occupant, via the notification device of the vehicle, of the fact that a failure occurs in the transceiver. As a notification device, for example, there is a warning lamp (warning light) arranged on the instrument panel (facia) in the front of the vehicle front. When the failure is confirmed, the ECU 100 outputs a signal (notification signal) to the control device that controls the instrument panel (for example, the ECU connected to the network 10 (communication bus 1)) to switch the warning lamp from an extinguished state to a lit state. This notifies the occupant that the transceiver has failed. In addition to the notification by the warning lamp, it is possible to perform notification by various notification devices such as displaying on a vehicle monitor and outputting a warning sound. The content of the notification may be a specific notification (direct notification) of the failure point, or may be a notification to the dealer or a type of notification urging a visit (indirect notification).

Although the occupant is notified only when the priority is the lowest here, the notification may be similarly given through the notification device even when the priority is high as in the process of the flowchart of FIG. 4 described later. However, in this case, it is recommended that the dealer is notified as soon as possible in view of the seriousness of the failure. Therefore, in addition to or instead of the notification by the warning light, it is desirable to notify that the dealer urgently comes for receiving maintenance through texts, voice, or the like.

(3-2) Action when Failure of Communication Bus with High Priority is Confirmed

When the priority of the communication bus connected to the transceiver with the confirmed failure is higher than the priority of the communication bus connected to other normal transceivers (that is, a case where the transceiver 112 connected to the highest priority bus 2 as in the example of FIG. 3 has failed), it is necessary to put the failed transceiver into a sleep state in order to disconnect the failed transceiver from the network formed by the communication bus connected to the failed transceiver. In this embodiment, when the failure of the transceiver 112 is confirmed, the CPU 106 sets the signal to the sleep-2 input terminal 134 from the L signal to the H signal (see timing 312 in FIG. 3). By setting the signal to the sleep-2 input terminal 134 to the H signal, the transceiver 112 enters the sleep state and is disconnected from the network 20 configured by the communication bus 2 (see timing 314 in FIG. 3). In this document, the H signal output to the sleep input terminals 124, 134, and 144 may be referred to as a sleep command.

Next, in order to transmit and receive information to be originally transmitted and received by the failure transceiver via a normal transceiver having a relatively low priority than that of the failed transceiver, the CPU 106 sets a switch, which switches connection and disconnection of two communication buses for connecting both transceivers, to the ON state, and connects the normal transceiver having a relatively low priority to two networks forming the two communication buses. This enables communication between the ECU connected to the network to which the failed transceiver belongs and the gateway ECU 100 via the normal transceiver. In this embodiment, the switch that connects the communication bus having the lowest priority among the communication buses connected to the normal transceiver and the communication bus connected to the failed transceiver is set to the ON state, and the normal transceiver is thereby set to be connected to two networks.

Specifically, in order to set the switch 50, which connects the network 20 to which the failed transceiver 112 belongs and the network 10 having the lowest priority, to the ON state, the L signal is output to the switch 50 as the CPU output 1 (150) (see timing 320 in FIG. 3). When the L signal is input as the CPU output 1 (150), the switch 50 is set to the ON state, and the network 10 and the network 20 are connected to the transceiver 110 (see timing 322 in FIG. 3). After that, the data (data for the network 20) transmitted from the CPU 106 to the Tx2 output terminal 132 of the transceiver 112 before the failure of the transceiver 112 is transmitted to the Tx1 output terminal 122 of the transceiver 110. This allows the data to be sent to the network 20 as before the transceiver 112 fails (see timing 330 in FIG. 3). On the other hand, the data transmitted from the network 20 is transmitted to the CPU 106 via the switch 50 and the transceiver 110. That is, CPU 106 can receive data from network 20 as before transceiver 112 fails.

Figure 4:
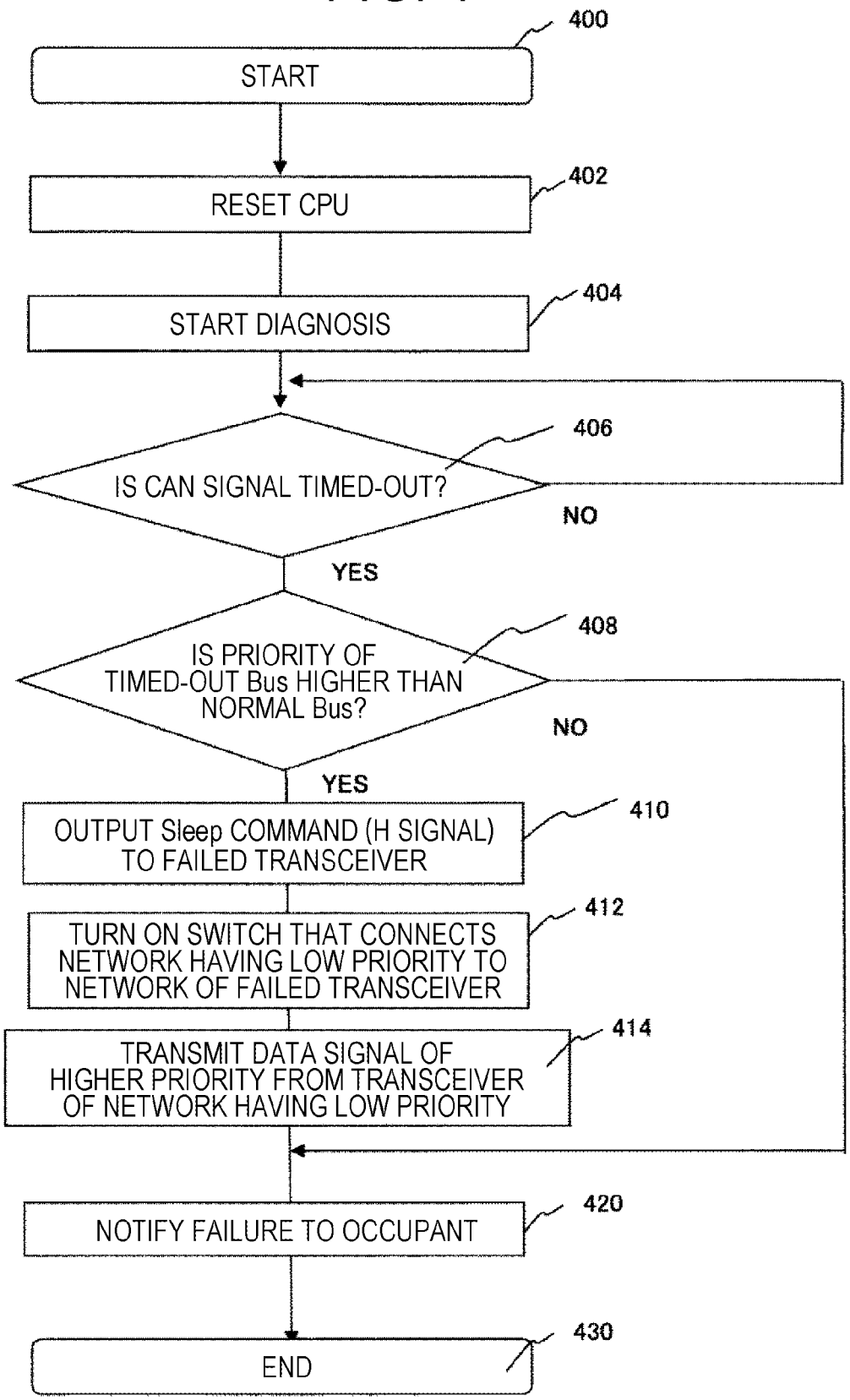
FIG. 4 is a diagram illustrating an example of a control flowchart of a CPU.

FIG. 4 illustrates a control flowchart of the CPU 106 of this embodiment. When the ECU 100 is started up, the voltage (VB) 102 is supplied to the power source circuit 104 inside the ECU 100, and the power source circuit 104 generates a positive power source voltage (VCC) to be supplied to a signal system element such as the CPU 106 that controls signal processing, and the CPU 106 starts the operation (Step 400). Next, the CPU 106 is reset (Step 402). After that, the CPU 106 starts normal operation and diagnosis (Step 404).

In Step 406, the CPU 106 executes a timeout process of determining whether there is a response from each of the transceivers 110, 112, and 114 according to whether the CAN signal input from the Rx output terminals 120, 130, and 140 of three transceivers 110, 112, and 114 in the ECU 100 sticks to the H signal for a predetermined time or longer. If the signal from any one of the three transceivers sticks to the H signal for a predetermined time or longer, the normal process is aborted and it is determined that a failure has occurred in that transceiver, and the process is shifted to a process from Step 408 onward which are performed at the time of failure. On the other hand, when the signals of the transceivers 110, 112, and 114 are not stuck to the H signal, the determination process of Step 406 is continuously executed.

In Step 408, the CPU 106 checks the identification number of the communication bus (timed-out bus) connected to the failed transceiver, refers to the priority of each communication bus stored in the memory 108, and determines whether the priority of the communication bus connected to the failed transceiver is higher than the priority of any one of the other two communication buses (that is, the communication buses connected to the normal transceivers).

If it is determined in Step 408 that the communication bus to which the failed transceiver is connected is lower in priority than any one of the other two communication buses, that is, the communication bus of the failed transceiver has the lowest priority, the occupant is notified of the failure of the transceiver by means such as turning on a warning lamp (Step 420), and the process is ended (Step 430).

On the other hand, if it is determined in Step 408 that the priority of the communication bus connected to the transceiver in which the failure has occurred is higher than the priority of one of the other two communication buses, that is, the priority of the communication bus in the failed transceiver is the highest or next, the process proceeds to Step 410.

In Step 410, the CPU 106 switches the signal output to the sleep input terminal of the failed transceiver (that is, any one of the three sleep input terminals 124, 134, and 144) from the L signal to the H signal (sleep command) and outputs the signal, and disconnects the failed transceiver from the network.

In Step 412, the CPU 106 switches the signal from the H signal to the L signal, which is output to the switch (that is, any one of three switches 50, 60, and 70) to connect the network formed by the communication bus having the lowest priority among the communication buses having the priorities lower than the communication bus of the failed transceiver and the network to which the failed transceiver belongs, and sets the switch to the ON state.

In Step 414, the CPU 106 transmits and receives the signal of the network (failed network), where the failed transceiver belongs before the failure, via the transceiver which belongs to another network (normal network) connected to the failed network in Step 412. After that, the CPU 106 notifies the occupant of the failure of the transceiver by means such as turning on a warning lamp (Step 420), and ends the process (Step 430).

In the gateway ECU 100 of the above embodiment, when communication from a transceiver belonging to a high priority network in the ECU 100 is interrupted, the switch that connects the network to which the transceiver belongs and the low priority network in the ECU 100 is set to the ON state, so the transceiver belonging to the network having a priority lower thereof is connected even to the high priority network. Then, communication with the high priority network can be maintained by transmitting/receiving data with respect to the high priority network via the transceiver belonging to the low priority network. Therefore, without constructing a redundant system that always connects to two networks, the operation of, for example, a powertrain system ECU connected to a high priority network can be continued even after the transceiver fails, and the vehicle can run to the dealer. This makes it possible to provide an inexpensive in-vehicle ECU (in-vehicle gateway device) with high reliability.

FIG. 5 illustrates the state of data flowing on the network formed by each communication bus.

FIG. 5(*a*) illustrates the state of data flowing on the respective buses 1, 2, and 3 in a normal state. For example, the ECU connected to the network 10 transmits/receives unique data to/from the bus 1. In this example, it is assumed that data 1A and 1B are periodically transmitted and received. Similarly, it is assumed that the ECU connected to the network 20 periodically transmits and receives data 2A and 2B to/from the bus 2, and the ECU connected to the network 30 periodically transmits and receives data 3A and 3B to/from the bus 3.

FIG. 5(*b*) illustrates the state of data flowing on the respective buses 1, 2, and 3 when a failure occurs in the transceiver 112 connected to the bus 2 (network 20). If the transceiver 112 (bus 2) fails, the lowest priority bus 1 (network 10) and the bus 2 (network 20) are connected through the switch 50, and data of two networks 10 and 20 is transmitted and received through the transceiver 110 connected to the bus 1. At this time, since the network 10 and the network 20 are connected, the data 1A, 1B, 2A, and 2B flow to each. At this time, the data 2A and 2B related to the network 20 having a higher priority are preferably transmitted first from the CPU 106 rather than the data 1A and 1B related to the network 10 having a lower priority in order not to cause a delay in operation of the power train ECU connected to the network 20.

Others

Although the case where the number of transceivers mounted on the gateway ECU is three (that is, the number of connected buses is three) has been described above, the invention is applicable even if the number of transceivers is two, four, or more.

Although different priorities are assigned to the buses in the above, there may be at least two priorities, or there may be multiple buses with the same priority.

In the above, the priority is given to the bus in consideration of the importance of the ECU connected to each bus, but the network configured by each bus may be prioritized, or the ECU connected to each network (each bus) may be prioritized.

Regarding the number of switch elements provided in the housing 109, all of the two communication buses having different priorities in all the communication buses arranged in the ECU housing 109 as in the embodiment of FIG. 3 described above may be connected with a switch. However, the communication bus having the lowest priority among all of the communication buses in the housing 109 and at least one communication bus excluding the communication bus having the lowest priority from all of the communication buses may be configured to be connected with a switch (that is, in the case of the example of FIG. 1, the switch 70 for connecting the buses 2 and 3 having the first and second priorities may be omitted). In the latter case, the number of switch elements in the housing is smaller than in the former case, so that the manufacturing cost of the ECU can be suppressed.

Further, in the above embodiment, after specifying a failed transceiver, a) disconnecting the specified transceiver from the network (Step 410 (see FIG. 4)), b) connecting the network to which the specified transceiver belongs to another network (Step 412), and c) transmitting/receiving data via the transceiver belonging to the other network (Step 414) are executed. However, regardless of the transceiver failure, the transceivers to be disconnected from the network may be arbitrarily determined and the processes a) to c) may be executed. For example, a communication terminal of a dealer or a manufacturer is connected to any one of a plurality of communication buses 1, 2, and 3, and a signal (first trigger signal) is output from the communication terminal to any one of the transceivers 110, 112, and 114 in the ECU 100 to cause the transceiver to shift a sleep state. As this type of signal (first trigger signal), for example, there is a signal which is output from a communication terminal of a dealer to the CPU 106, and causes the CPU 106 to output the sleep command (H signal) to the sleep terminal of a desired transceiver (sleep command output command). When the CPU 106 receives this signal, the CPU 106 outputs the sleep command (H signal) to the sleep terminal (that is, one of the three sleep terminals 124, 134, and 144) of the target transceiver and shifts the target transceiver to the sleep state. By doing so, the transmission of the CAN signal from the target transceiver to the CPU 106 is interrupted, so that it is possible to shift from Step 406 to Step 408 in the flowchart of FIG. 4. As a result, the processes from Step 408 including the processes of a) to c) can be executed, and the same process as that when a failure occurs can be executed. In this way, if it is possible to artificially execute the same process as that when a failure occurs, it is possible to check whether the ECU 100 actually operates according to the flowchart of FIG. 4 when a failure occurs. If the operation can be confirmed, the communication terminal outputs a signal (second trigger signal) for releasing the sleep state of the target transceiver. As this type of signal (second trigger signal), for example, there is a signal which is output from a communication terminal of a dealer to the CPU 106, and causes the CPU 106 to output the sleep release command (L signal) to the sleep terminal of a sleep target transceiver (sleep release command output command). When the CPU 106 receives this signal, the CPU 106 outputs the sleep release command (L signal) to the sleep terminal (that is, one of the three sleep terminals 124, 134, and 144) of the target transceiver and shifts the target transceiver to a normally activated state. In this case, it is preferable to connect the communication terminal to a communication bus other than the communication bus to which the transceiver in the sleep state is connected and transmit the sleep release command output command. When the sleep release command output command is output to the CPU 106, the transmission of the CAN signal from the target transceiver to the CPU 106 is restarted and the operation mode in the normal state can be restored. By the way, although a case where a terminal of a dealer is connected to the ECU 100 has been described here, even when a switch that outputs the sleep command and the sleep release command to the sleep terminal of a desired transceiver and a switch that causes the CPU 106 to output the sleep command and the sleep release command to the sleep terminal of a desired transceiver are provided in the ECU 100, the same configuration as the above described configuration is realized.

Hitherto, the embodiments of the invention have been described, but the invention is not limited to the embodiments. Various modifications may be made within a scope not departing from the spirit of the invention disclosed in claims. For example, the above embodiments have been described in detail for easy understanding of the invention, and the invention is not necessarily limited to having all the configurations described. In addition, some of the configurations of a certain embodiment may be replaced with the configurations of the other embodiments, and the configurations of the other embodiments may be added to the configurations of the subject embodiment. It is possible to add, delete, and replace other configurations for a part of the configuration of each embodiment.

Further, each configuration related to the ECU 100 described above and the function and execution process of each configuration may be realized by hardware partially or completely (for example, a logic that executes each function is designed by an integrated circuit). The configuration related to the ECU 100 described above may be a program (software) that realizes each function related to the configuration of the ECU by being read and executed by a processing device (for example, a CPU). Information related to the program can be stored in, for example, a semiconductor memory (flash memory, SSD, etc.), a magnetic storage device (hard disk drive etc.), a recording medium (magnetic disk, optical disk, etc.), or the like.

In addition, only control lines and information lines considered to be necessary for explanation are illustrated, but not all the control lines and the information lines for a product are illustrated. In practice, almost all the configurations may be considered to be connected to each other.

REFERENCE SIGNS LIST 1 communication bus (second communication bus)
2 communication bus (first communication bus)
3 communication bus (second communication bus)
10 network
20 network
30 network
50 switch
60 switch
70 switch
100 in-vehicle electronic control device (gateway device)
102 voltage
104 power source circuit
106 CPU (processing device)
108 memory
110 transceiver (second transceiver)
112 transceiver (first transceiver)
114 transceiver (third transceiver)
300 priority table

The invention claimed is:

1. A gateway device, comprising:
a plurality of transceivers that are connected to a plurality of communication buses in a one-to-one manner; and
at least one switch element that connects two communication buses having different priorities among the plurality of communication buses,
wherein the plurality of communication buses include a first communication bus to which a first control device is connected and a second communication bus to which a second control device is connected,
wherein the first communication bus has a higher priority than the second communication bus,
wherein the plurality of transceivers include a first transceiver connected to the first communication bus and a second transceiver connected to the second communication bus, and
wherein the at least one switch element is a switch element that connects the first communication bus and the second communication bus.

2. The gateway device of claim 1,
wherein, when a failure occurs in the first transceiver, the first transceiver is disconnected from the network formed by the first communication bus, and the switch element is set to an ON state to communicate with the first control device via the second transceiver.

3. The gateway device of claim 1, further comprising:
a processing device that is connected to each of the plurality of transceivers,
wherein, when a situation in which data cannot be received from the first transceiver has continued for a predetermined time or more, the processing device is configured to disconnect the first transceiver from the network formed by the first communication bus and set the switch element to an ON state to communicate with the first control device via the second transceiver.

4. The gateway device of claim 1, further comprising:
a processing device that is connected to each of the plurality of transceivers,
wherein, when a situation in which data cannot be received from the first transceiver has continued for a predetermined time or more, the processing device is configured to set the switch element to an ON state, output a sleep command to the first transceiver, and transmit data transmitted to the first transceiver to the second transceiver.

5. The gateway device of claim 3,
wherein, when a situation in which data cannot be received from the first transceiver has continued for a predetermined time or more, the processing device is configured to determine that a failure has occurred in the first transceiver.

6. The gateway device according to claim 3, wherein the processing device is configured to output a notification signal for notifying an occupant that a failure has occurred in the first transceiver via a notification device.

7. The gateway device of claim 3,
wherein, the processing device is configured to output a sleep command to the first transceiver when a first trigger signal is input via any one of the plurality of communication buses, and output a sleep release command to the first transceiver when a second trigger signal is input via any one of the plurality of communication buses when the first transceiver is in a sleep state.

8. The gateway device of claim 1,
wherein the first control device is any one of power train ECUs including an engine control ECU, a brake control ECU, and a transmission control ECU.

9. The gateway device of claim 1, further comprising:
a memory in which priorities of the plurality of communication buses are stored; and
a processing device that is connected to each of the plurality of transceivers,
wherein, when a situation in which data cannot be received from a first transceiver connected to a first bus included in the plurality of communication buses among the plurality of transceivers has continued for a predetermined time or more, the processing device is configured to disconnect the first transceiver from a network formed by the first bus, set sets a switch element that connects the first transceiver and a second transceiver connected to a second bus having a priority lower than the first bus among the plurality of switch elements to an ON state, and execute communication with a control device connected to the first bus via the second transceiver.

10. A gateway device, comprising:

a plurality of transceivers that are connected to a plurality of communication buses in a one-to-one manner;

at least one switch element that connects two communication buses having different priorities among the plurality of communication buses;

a memory in which priorities of the plurality of communication buses are stored; and a processing device that is connected to each of the plurality of transceivers, wherein, when a situation in which data cannot be received from a first transceiver connected to a first bus included in the plurality of communication buses among the plurality of transceivers has continued for a predetermined time or more, a switch element that connects the first transceiver and a second transceiver connected to a second bus having a priority lower than the first bus among the plurality of switch elements is set to an ON state, the processing device is configured to output a sleep command to the first transceiver, and data transmitted to the first transceiver is transmitted to the second transceiver.

11. A gateway device, comprising:

a plurality of transceivers that are connected to a plurality of communication buses in a one-to-one manner;

at least one switch element that connects two communication buses having different priorities among the plurality of communication buses;

a memory in which priorities of the plurality of communication buses are stored, wherein, when the priority of the second communication bus is the lowest among the priorities of the plurality of communication buses, the plurality of switch elements are configured to respectively connect at least one of the plurality of communication buses excluding the second communication bus and the second communication bus.

* * * * *